(12) United States Patent  
Wild (10) Patent No.: US 8,699,636 B2
(45) Date of Patent: Apr. 15, 2014

(54) LONG RANGE RADIO FREQUENCY IDENTIFICATION SYSTEM

(76) Inventor: Ben Wild, San Francisco, CA (US)

( * ) Notice: Subject to any disclaimer, the term of this patent is extended or adjusted under 35 U.S.C. 154(b) by 413 days.

(21) Appl. No.: 12/830,923

(22) Filed: Jul. 6, 2010

(65) Prior Publication Data

US 2011/0032081 A1 Feb. 10, 2011

Related U.S. Application Data

(60) Provisional application No. 61/273,660, filed on Aug. 7, 2009.

(51) Int. Cl.
 *H03D 1/00* (2006.01)
 *H04L 27/06* (2006.01)
(52) U.S. Cl.
 USPC .......................................... 375/343; 375/340
(58) Field of Classification Search
 USPC ....................................... 340/10.42; 375/343
 See application file for complete search history.

(56) References Cited

U.S. PATENT DOCUMENTS

| | | | |
|---|---|---|---|
| 6,411,645 B1 * | 6/2002 | Lee et al. | 375/140 |
| 6,493,376 B1 * | 12/2002 | Harms et al. | 375/130 |
| 6,700,931 B1 * | 3/2004 | Lee et al. | 375/239 |
| 7,492,316 B1 | 2/2009 | Ameti et al. | |
| 7,593,383 B1 | 9/2009 | Myers | |
| 2005/0007236 A1 * | 1/2005 | Lane et al. | 340/5.86 |
| 2005/0275531 A1 * | 12/2005 | Johnson | 340/539.22 |
| 2006/0109109 A1 | 5/2006 | Rajapakse et al. | |
| 2007/0013516 A1 * | 1/2007 | Freitag et al. | 340/572.1 |
| 2007/0126623 A1 | 6/2007 | Workman | |
| 2007/0183370 A1 | 8/2007 | Wallace et al. | |
| 2009/0180518 A1 * | 7/2009 | Ishii et al. | 375/130 |
| 2009/0180524 A1 * | 7/2009 | Wang et al. | 375/149 |
| 2009/0261971 A1 * | 10/2009 | Viegers et al. | 340/539.22 |
| 2010/0039326 A1 | 2/2010 | LeFever et al. | |
| 2011/0018691 A1 * | 1/2011 | Park et al. | 340/10.2 |
| 2011/0193958 A1 * | 8/2011 | Martin et al. | 348/143 |

* cited by examiner

*Primary Examiner* — Erin File (57) ABSTRACT

A method and apparatus for building a long range RFID system is disclosed. A new signaling structure called Block Pseudo Noise is described that allows for more computationally efficient decoding. A novel approach to synchronize the RFID reader local oscillator with the RFID tag oscillator using an on board GPS receiver on the RFID tags and RFID reader is also disclosed. A novel positioning technique called Asynchronous Time Difference of Arrival used to located RFID tags is also disclosed.

14 Claims, 11 Drawing Sheets

LONG RANGE RADIO FREQUENCY IDENTIFICATION SYSTEM

CROSS-REFERENCE

This application claims priority to U.S. Application No. 61/273,660 filed on Aug. 7, 2009, "Wireless asset tracking system" the contents of which are hereby incorporated by reference in their entirety.

TECHNICAL FIELD

The Subject matter described herein relates generally to methods and apparatus for long range wireless radio frequency identification (RFID) devices. More particularly, but not exclusively, the subject matter described herein relates to algorithms used to extend the range of RFID tags, locate RFID tags and systems and methods for the use of GPS satellite signals for time and frequency synchronization of RFID tags.

BACKGROUND

Prior Art

Early work related to range extension in wireless communication and positioning networks can be found in US Application No. 20100039326, published on Feb. 18, 2010, "Variable Coherence Integration for the Location of Weak Signals," the contents of which are hereby incorporated by reference in their entirety. In that invention, a known input sequence is broken up into smaller segments. Each segment is matched filtered, and the outputs of the matched filters are combined non-coherently. This technique was proposed due to the fact that the transmitter and receiver are never perfectly frequency synchronized, consequently attempting to match filter over a long segment would result in poor performance. Furthermore, the required complexity to matched filter over long periods of time increases linearly with the correlation time, making it cost prohibitive to implement very long matched filters. The disadvantage of this approach is that one cannot obtain the full coherent processing gain. For example, matched filtering to a sequence of length 1000 samples in theory can produce a processing gain of 30 dB compared to a single sample. By breaking up the sequence into 10 segments of 100 samples each, and non-coherently combining the samples, a processing gain of 25 dB is achievable.

SUMMARY

This disclosure describes systems and methods for construction of long range radio frequency identification systems. Described is an approach using the global positioning system (GPS) to frequency synchronize oscillators in RFID tags and RFID readers which enables very large coherent processing gains to be achieved, thus maximizing the wireless range. The construction of signals called Block Pseudo Noise sequences is described which allow for the efficient implementation of decoders to decode very weak signals. Furthermore, in long range RFID systems, it is important to be able to locate RFID tags in an efficient manner. A new approach called Asynchronous Time Difference of Arrival (ATDOA) is described which allow for precise positioning of RFID tags without the need for precise time synchronization amongst readers. In RFID systems with multiple readers and tags, it is important to reduce interference between tags and readers, new techniques are described which efficiently minimize interference. The subject matter includes a system for long-range RFID communication, including one or more RFID readers and one or more RFID tags. Some or all of the readers and tags may have an oscillator frequency synchronization circuit.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Some of the terms used within the application are described here.

AC—Alternating Current

Amplitude Modulation—The variation of the signal strength of the transmit signal in relation to the information being sent.

Coherent Processing—Matched Filtering when the unknown signal is in frequency and phase synchronization with the known template signal.

GPS—Global Positioning System

Matched Filter—The correlation of a known signal, or template with an unknown signal to detect the presence of the known template in the unknown signal.

Pseudo Noise Sequence—A sequence of numbers with pseudorandom properties intended to simulate white noise.

Pulse Position Modulation—A form of signal modulation in which M message bits are encoded by transmitting a single pulse in one of $2^M$ possible time-shifts.

Figure 1:
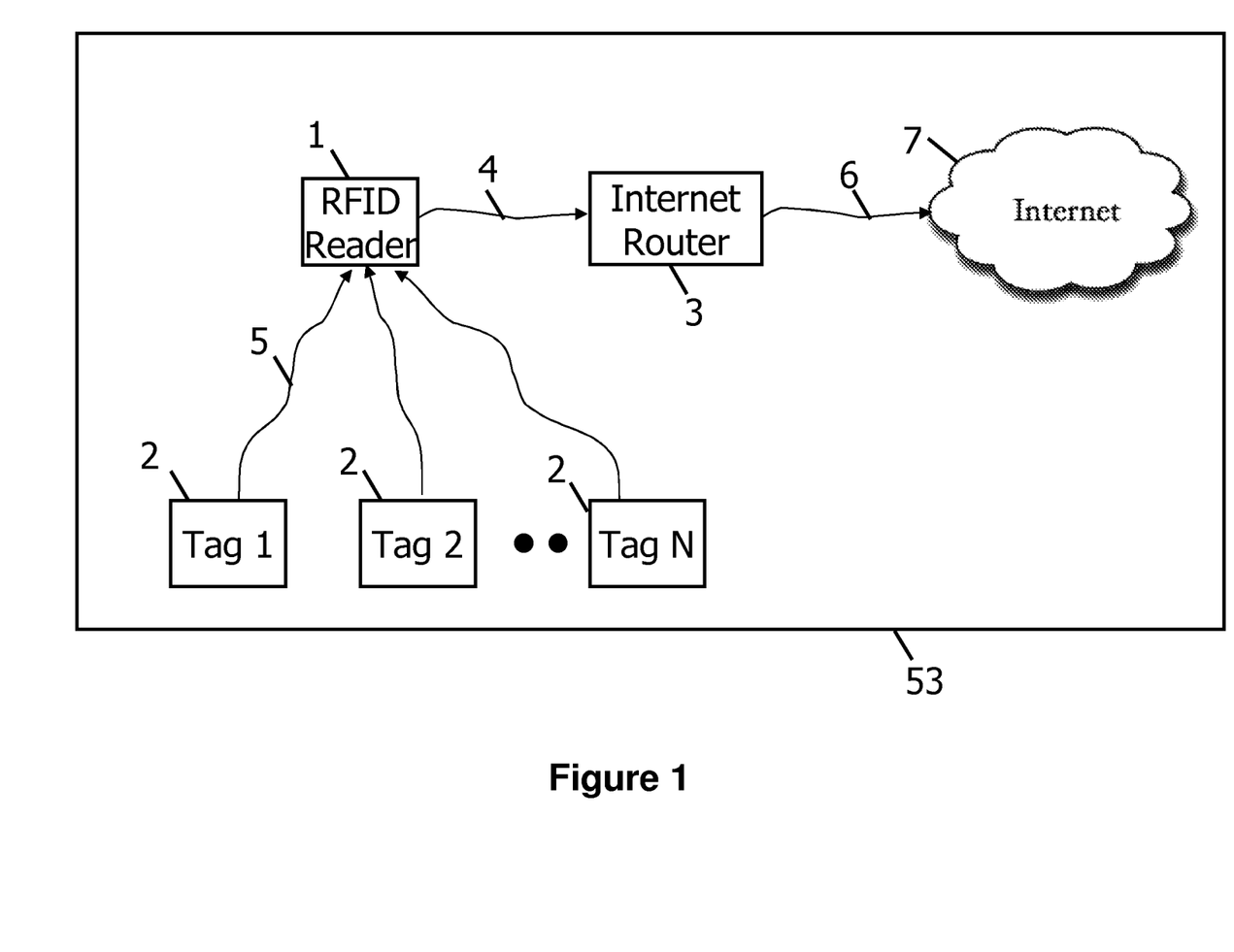
FIG. 1 depicts a long range RFID system consisting of RFID readers and RFID tags.

FIG. 1 is a schematic diagram of an RFID system 53 that embodies aspects of the present invention. The apparatus includes one or more radio frequency identification (RFID) tags 2, and one or more RFID readers 1. FIG. 1, as well as other figures, does not necessarily show all the components of the apparatus but only those needed to convey an understanding of the invention. The figure may represent only one embodiment of the invention.

Figure 2:
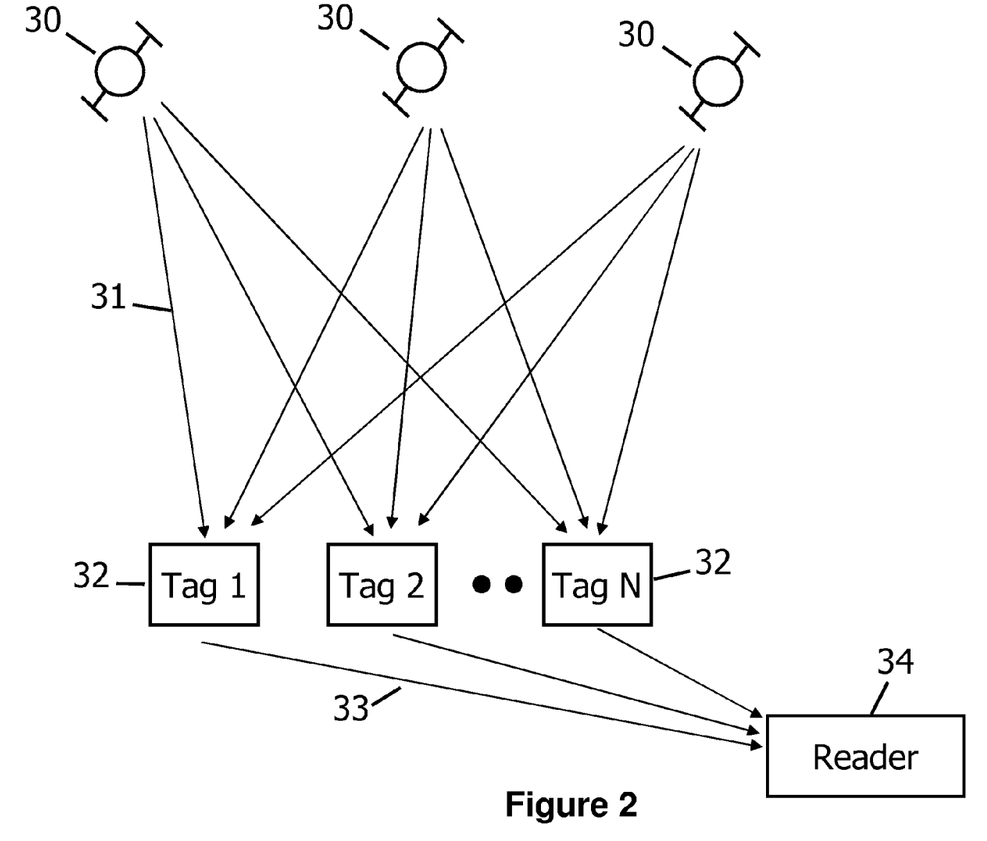
FIG. 2 depicts the use of GPS satellites for time and frequency synchronizing RFID tag and RFID readers.

FIG. 2 is a block diagram illustrating one embodiment which makes use of GPS satellite signals for time and frequency synchronizing RFID tags and RFID readers. The GPS transmit signals 31 are received by the RFID tags 32 and by one or more RFID readers 34. The tags and RFID readers incorporate a GPS receiver which is able to frequency and time synchronize to the atomic clock of the GPS satellites. Once time synchronized, each tag in the network can be assigned a unique time slot to transmit its message.

Figure 3:
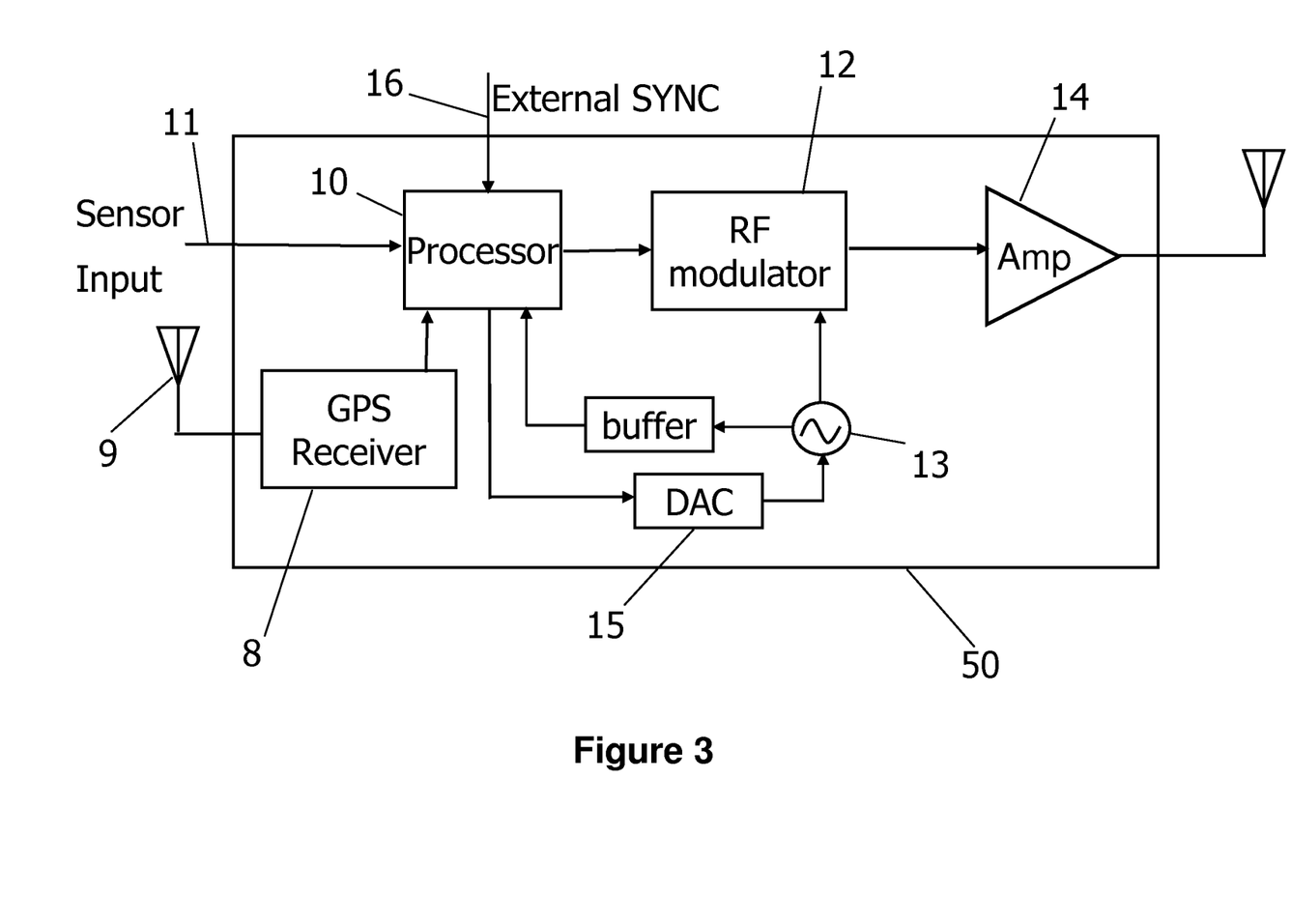
FIG. 3 depicts the architecture of an RFID tag described in this invention.

FIG. 3 is a block diagram of the RFID tag 50. In one embodiment, the tag includes a GPS receiver 8, and an antenna 9 through which the GPS receiver can receive GPS radio signals. The tag also includes a microprocessor 10 which controls aspects of the tag communication such as transmit interval and oscillator calibration. The tag 50 further includes an external port 11 allowing for external analog and digital signals to be received. One example could be a temperature sensor analog output. For transmitting data, the tag includes an RF modulator 12 controlled by the microprocessor. In one embodiment, the modulation format used is binary phase shift keying (BPSK) although it is not necessary to use this format. Other formats may be used. A local oscillator 13 is fed into the RF modulator. The modulator modulates the input sine wave by the modulation signal input by the processor. The local oscillator can be any frequency, in one embodiment, the frequency is 900 MHz, in another embodiment, the frequency can be anywhere from 3-10 GHz to cover the ultra wideband frequency band. The local oscillator can be generated from a crystal oscillator designed to oscillate at the desired transmit frequency. Alternatively, the local oscillator can be synthesized from a crystal oscillator running at a lower frequency. In the synthesized case, a phased locked loop is used to multiply the oscillator frequency to the higher transmit frequency. The oscillator is also fed back to the processor so that the processor can measure the oscillator frequency relative to a more stable source such as the 1PPS output of a GPS receiver or an external synchronization signal 16. The processor can correct for any frequency errors by using a digital to analog converter 15 which drives the voltage control input of the oscillator. The voltage control input of an oscillator allows for tuning of the local oscillator frequency.

Figure 4:
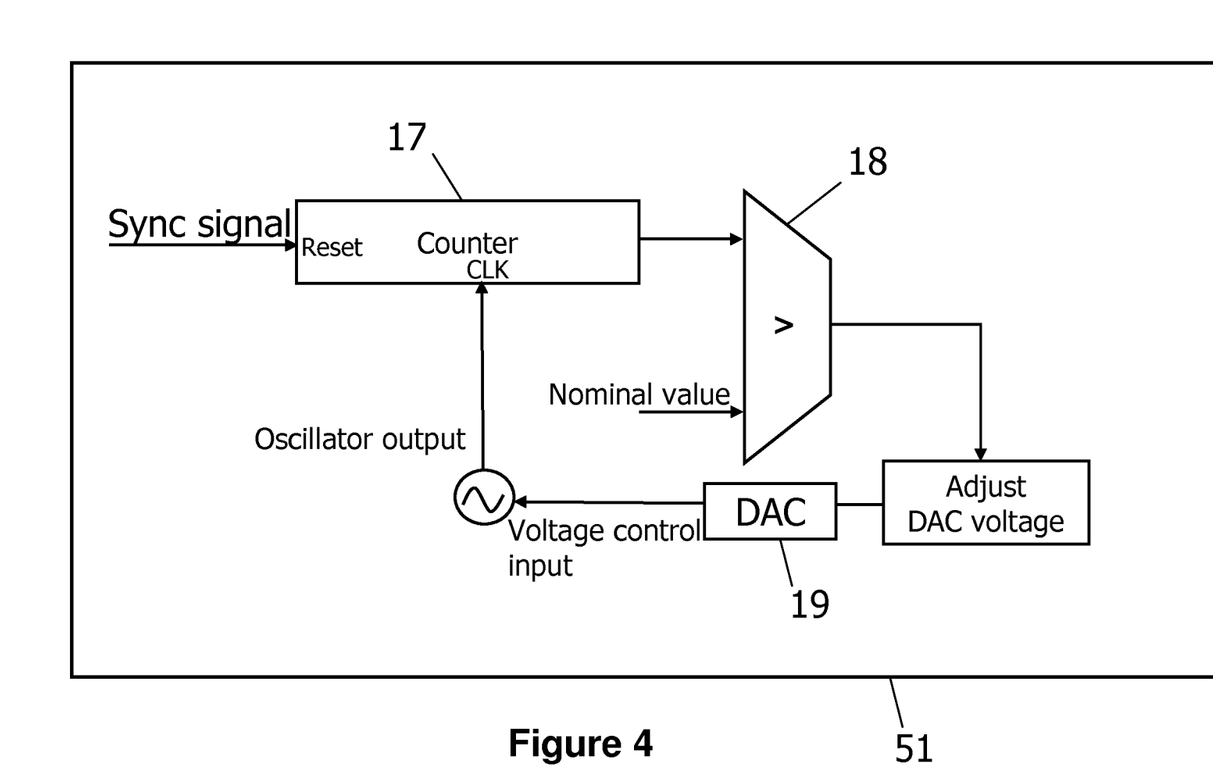
FIG. 4 depicts an oscillator frequency synchronization circuit.

For detecting weak signals in very long range communication systems it is pivotal for the receiver local oscillator and the transmitter local oscillator frequency to be very tightly synchronized. One approach for making sure that the transmitter local oscillators are tightly synchronized is to use atomic clocks. Atomic clocks are very stable and do not vary much in frequency. However, atomic clocks are very expensive, making them impractical to implement in low cost tags and receivers. To allow for inexpensive local oscillator synchronization, a clock synchronization circuit is used at the tag and at the receiver. FIG. 4 depicts one embodiment of a clock synchronization circuit 51. The synchronization circuit 51 takes as input the crystal output signal, or a function of the output signal which could be the phase locked loop output signal. The second signal that the circuit takes as input is a synchronization (sync) signal. This synchronization signal is a signal with a stable frequency that can be used by the tag and the receiver to calibrate the crystal oscillator. In one embodiment this signal is the 1 pulse per second (1PPS) output signal from a GPS receiver. In an alternate embodiment this signal is a 60 Hz AC signal from a power outlet. Any other signal that has a stable frequency can also be used.

The synchronization circuit 51 in FIG. 4 calibrates the crystal oscillator so that the oscillator frequency is locked to the sync signal. The synchronization circuit 51 includes a counter 17 whose clock input is driven by the crystal oscillator output; the reset input of the counter is driven by the sync signal. In effect, the counter counts the number of crystal oscillator cycles contained in one or more periods of the sync signal. At each tag and receiver, each synchronization circuit 51 is programmed with a nominal number of crystal cycles that should be contained within the sync period. A comparator 18 is used to compare the count value to the nominal value. Crystal oscillators typically contain a voltage control input that allows for the adjustment of the output frequency. The voltage is adjusted using a digital to analog converter (DAC) output signal. The DAC is programmed with a value based on the counter value and possibly a transfer function that describes the voltage frequency characteristics of the crystal oscillator. If a transfer function is not available, the algorithm to adjust the control voltage can be a binary search. A binary search algorithm is efficient here due to the fact that in a typical oscillator, the crystal frequency changes monotonically with the control voltage input. In the binary search algorithm, an initial voltage is set for the DAC. If a count value is measured that is larger than the nominal value, the crystal frequency is too high, and a lower control voltage needs to be programmed into the DAC, otherwise, a higher control voltage is needed to increase the frequency. This process is repeated until the correct voltage is found.

Figure 5:
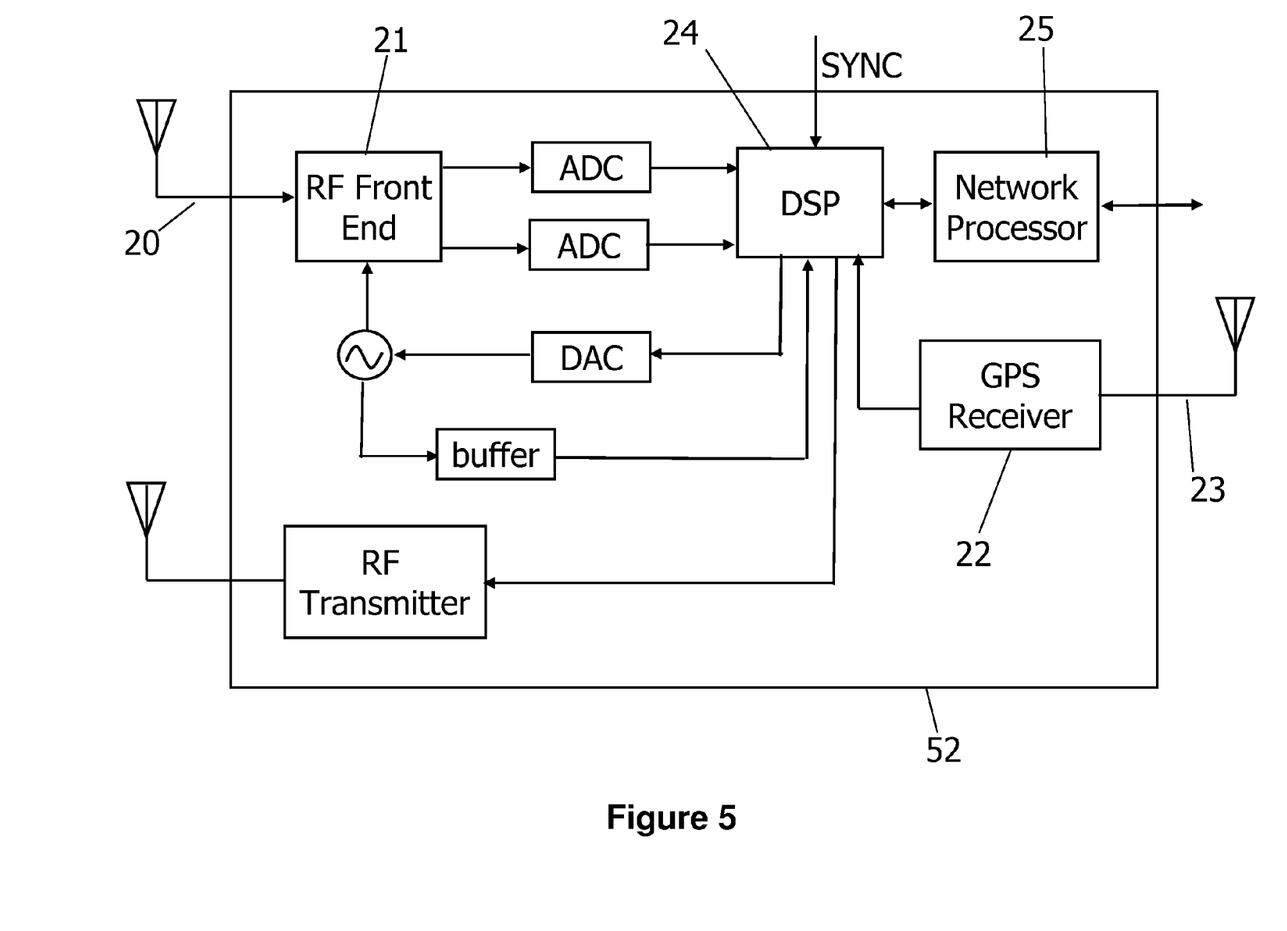
FIG. 5 depicts an architecture for the RFID Reader described in this invention.

FIG. 5 depicts the architecture of the RFID reader 52. The RFID reader 52 contains an antenna 20 through which the receiver receives RFID signals from tags. The RF front end 21 amplifies and down converts the RFID signal to a lower frequency from the higher RFID frequency band. The RFID reader 52 also contains a GPS receiver 22 and GPS antenna 23. The GPS receiver is used to synchronize the local oscillator to the tag population using an oscillator synchronization circuit as described in FIG. 4. The GPS receiver is also used to locate the RFID reader and report this to a server. The RFID reader 52 also contains a digital signal processor (DSP) 24 in which algorithms are implemented to obtain very high receiver sensitivity. The RFID reader contains a network processor 25 which connects to the internet through one of several ways. In one embodiment the network processor connects to the internet over a wired Ethernet connection. In an alternate embodiment, the network processor connects over a wireless medium such as 802.11 or a cellular connection. The receiver has a local oscillator that is generated using a crystal oscillator. In order to synchronize the oscillator frequency to the tag population oscillator frequencies, an oscillator synchronization circuit is implemented, as described in a previous section. The sync signal can be either the 1 PPS signal from the GPS receiver, a 60 Hz AC signal from the power line or some other signal that has a stable frequency.

Figure 6:
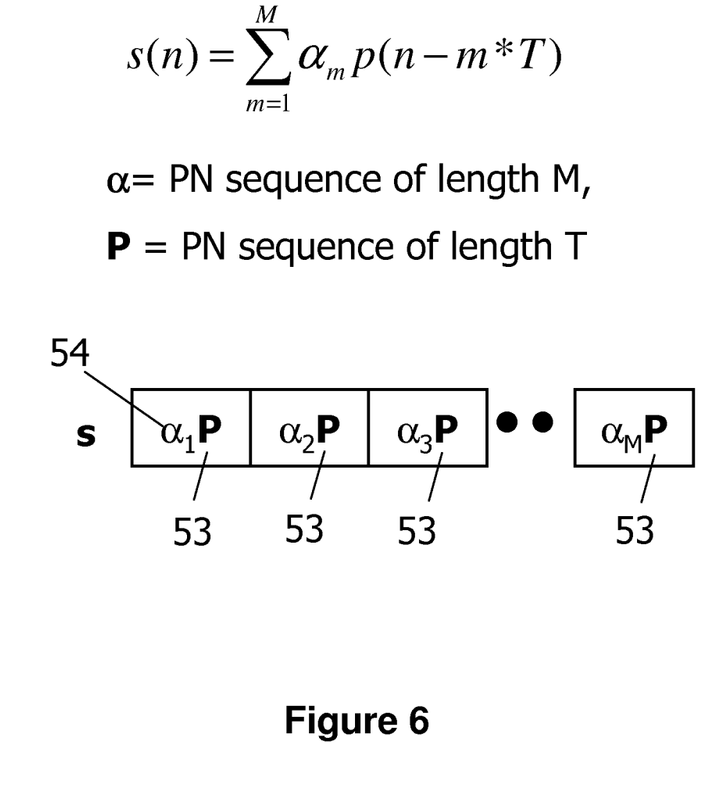
FIG. 6 depicts the signal structure of a block pseudo noise sequence.

To obtain very high receiver sensitivity, and consequently ultra long communication range from the tag to the RFID reader, novel digital signal processing techniques are used at the RFID reader receiver. To transmit data, a tag transmits a novel signal called a block pseudo noise sequence during multiple time slots and possibly different phases. A pseudo noise (PN) sequence is a deterministic sequence picked from a white noise process. A longer PN sequence can be detected at a lower receiver signal to noise ratio because more energy can be integrated. However, using very long PN sequences have 2 drawbacks that are addressed in this invention. The first drawback is that the frequency synchronization between transmitter and receiver needs to be tighter. For example, consider a transmitter operating at 900 MHz and a receiver operating at 900 MHz±2 KHz which is a typical difference in frequency even for a temperature compensated crystal oscillator based system. The size of the frequency offset will limit the maximum time that the PN sequence can be coherently integrated. The frequency calibration procedure discussed in the previous section aims to mitigate this problem. The second problem is that longer PN sequences substantially increase the complexity of the receiver decoder circuit. To reduce the complexity, a data sequence in this invention called a block PN sequence is transmitted for every symbol. FIG. 6 depicts a block PN sequence. Mathematically, the block PN sequence is described as:

$$s(n) = \sum_{m=1}^{M} \alpha_m p(n - m * T)$$

Where p(n) is defined as the "inner PN sequence" which is a length T PN sequence, α is defined as the "outer PN sequence" which is a length M PN sequence. A block PN sequence consists of the same PN sequence 53 multiplied by a scalar value 54, where each scalar value is an element of the outer PN sequence.

Figure 7A:
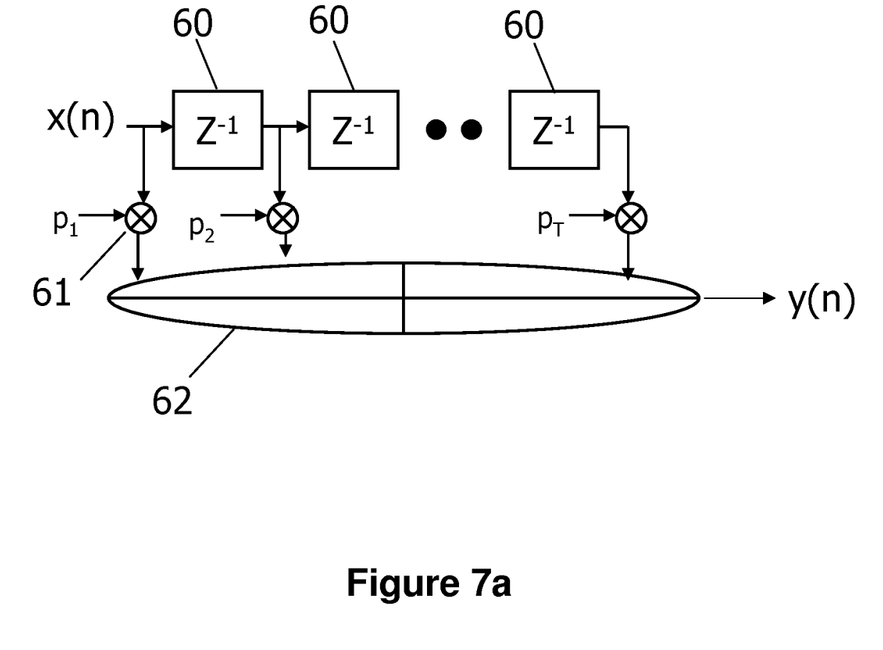
FIG. 7a depicts the inner matched filter structure.
Figure 7B:
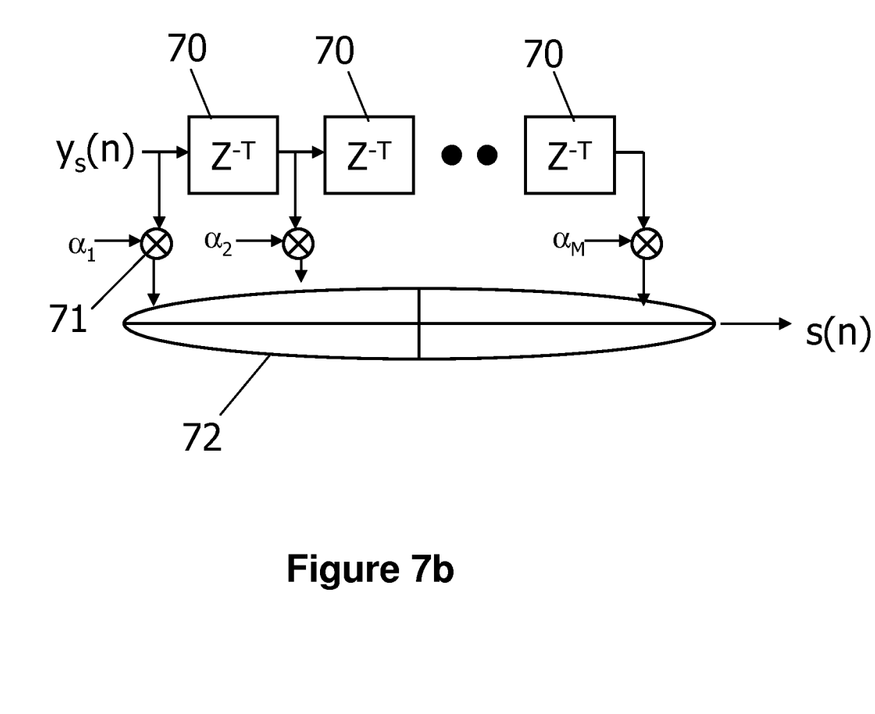
FIG. 7b depicts the outer matched filter structure.

Decoding a block PN sequence consists of 2 steps. The first step is to create a matched filter structure matched to the inner PN sequence which is called the inner matched filter. The structure of this filter is shown in FIG. 7a. The matched filter is composed of a bank of shift registers 60 where each shift register delay the incoming data stream by one sample. Each delayed copy of the input stream gets multiplied by an element of the inner PN sequence using a multiplier 61. The multiplied and shifted versions of the input stream are then summed up using an adder 62. The output of the inner matched filter is sent into the outer matched filter. FIG. 7b shows a block diagram of the outer matched filter. The filter consists of a tapped delay line, where each delay 70 is set to T samples. The output of each delayed version of the input signal is multiplied by an element of the outer PN sequence using a multiplier 71. The multiplied and shifted versions of the input stream are then summed using an adder 72.

Figure 7C:
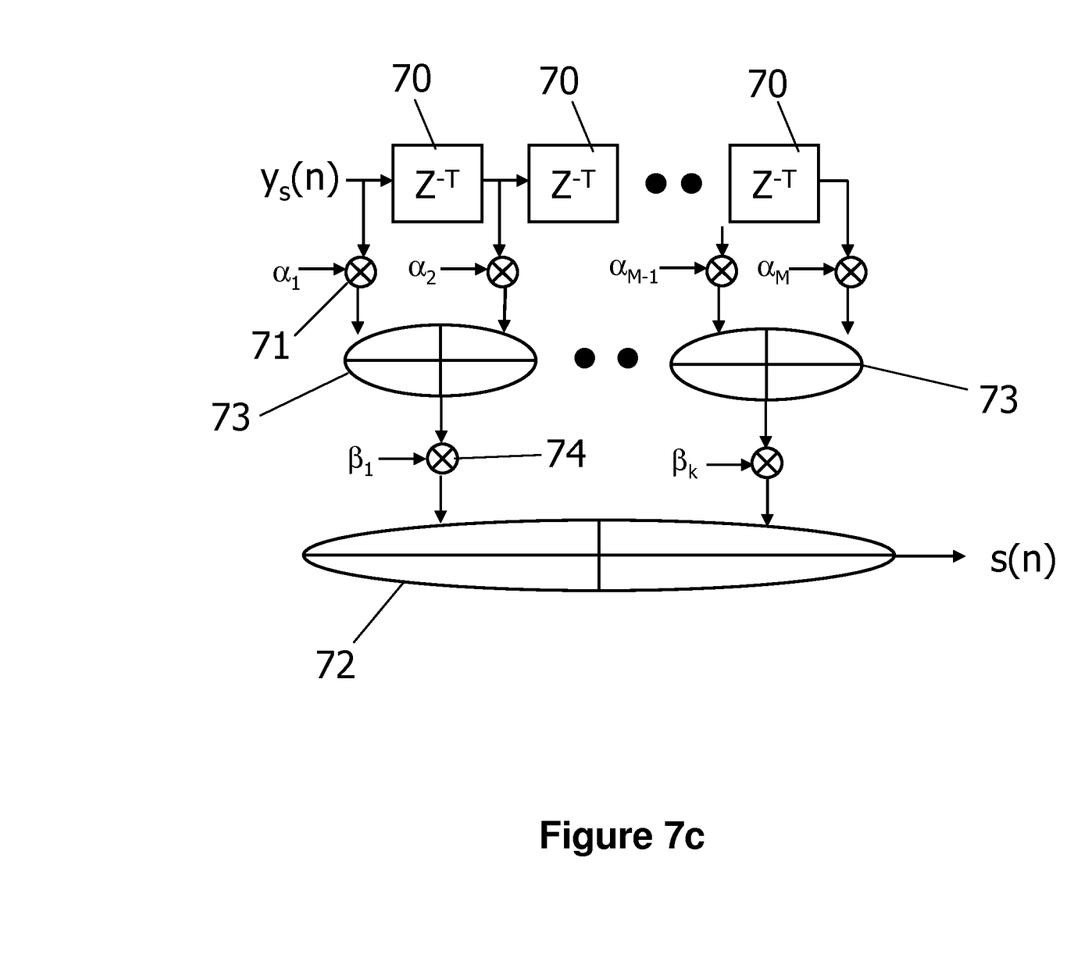
FIG. 7c depicts the outer matched filter structure with frequency correction circuitry.

In practice, the frequency synchronization approached discussed previously will not perfectly synchronize the transmitter and receiver local oscillator frequency. In order to correct for small frequency offsets between the RFID reader and RFID tag, a modified outer matched filter structure can be used. FIG. 7c shows a block diagram of a modified outer matched filter structure. After multiplication by the α sequences, the outputs of several of these multipliers are added together with an adder 73. The outputs of these adders are multiplied by a β sequence and then get input into a final adder 72. The β sequence tries to predict what the frequency offset is. For example, if the frequency offset is equal to $e^{j2\pi ft}$, then the β sequence that corrects for the frequency offset would be equal to $\beta_i = e^{-j2\pi fT*M*i}$, where T is the length of the inner matched filter, M is the number of outer matched filter taps that the adder 73 adds up, and i is the frequency correction tap number. A bank of these frequency correction tapped delay lines can be used to find the correct frequency offset. The tapped delay line that maximizes the output of the outer matched filter is used as the input to the decoding stage.

In order for the tag to send data to an RFID reader, data is encoded in one of several ways. In one embodiment, the tag sends a block PN sequence multiple times, where the times are selected such that the data is encoded in the absolute or relative times between PN code transmissions. This is similar to pulse position modulation used in standard digital communication systems. In an alternate embodiment, block PN sequences can be sent back to back, where each block is phase shifted to indicate which bit is being sent. Any other standard digital communication technique such as amplitude modulation can also be used to modulate the block PN code.

In many situations it is desirable to be able for the network of RFID readers to locate an RFID tag. In one embodiment, the tag acquires its position through its on board GPS receiver and transmits these coordinates to the nearest RFID reader. In an alternate embodiment, it may be necessary to locate the tag that does not have an on-board GPS receiver, or a tag that has an on-board GPS receiver but does not wish to turn the receiver on in order to save energy. In these cases, it is possible for a network of RFID readers to locate the tag. This invention discloses two methods for locating a tag using a network of RFID readers.

The first method for locating a tag consists of first time synchronizing the network of RFID readers. This can be done using GPS receivers that are integrated into the readers. The GPS receivers are synchronized to the atomic clock on the GPS satellites, and thus using the clock synchronization techniques described in the previous section can time synchronize the network of readers. When a tag signal is decoded at the reader, the reader records the time and reports this to a server. At the server the time of arrivals of the tag signal and the known reader locations are used to compute the tag location. This is called Time Difference of Arrival (TDOA) and is a well-known positioning technique.

Figure 8:
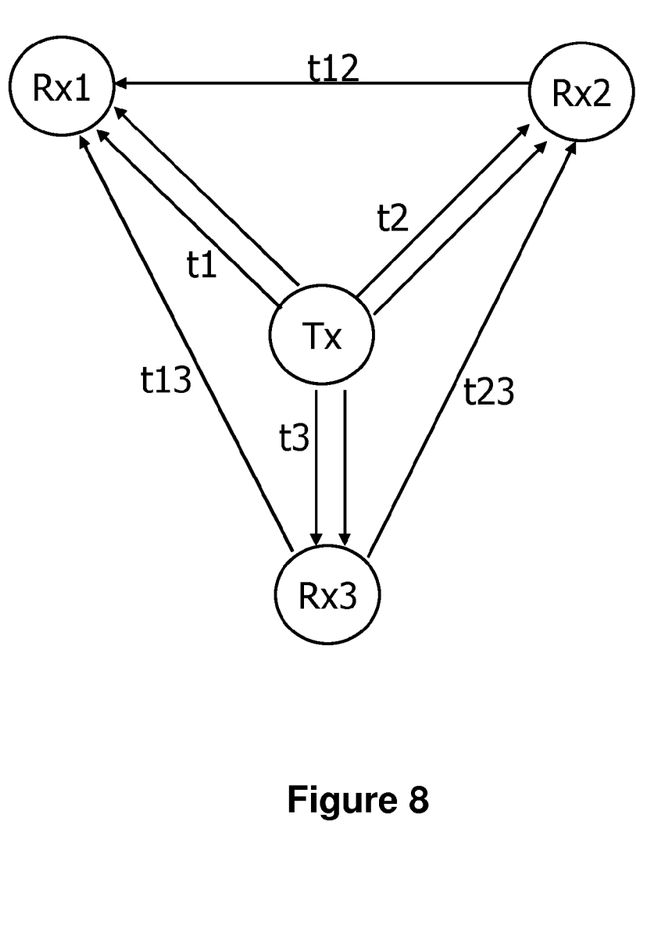
FIG. 8 depicts the asynchronous time difference of arrival approach for locating RFID tags.

In an alternate embodiment the tag location can be estimated even when time synchronization among RFID readers is not possible, or when synchronization cannot be made tight enough such as the case when sub 1 foot resolution is required in an ultra wideband positioning system. The new positioning technique disclosed in this invention is called Asynchronous Time Difference of Arrival and is illustrated in FIG. 8. For illustration purposes, 3 RFID readers are assumed to hear (receive) the tag transmit signal. When reader 1 hears the tag signal, it retransmits a unique PN sequence back to reader 2 and reader 3. When reader 2 hears the tag signal, it retransmits a unique PN sequence to reader 1 and reader 3. When reader 3 hears the tag signal, it retransmits a unique PN sequence to reader 1 and reader 2. Thus, each reader will received the PN sequence from the tag, and a short amount of time afterwards, will hear unique PN s from the 2 other readers.

Each reader will then compute the time difference between the arrival of the tag PN sequence and the arrival of the PN sequences from the other RFID readers. The computations are mathematically described as follows:

$$\Delta_{13} = (t_3 + t_{13}) - t_1, \Delta_{12} = (t_2 + t_{12}) - t_1, \quad \text{Reader1}$$

$$\Delta_{21} = (t_1 + t_{12}) - t_2, \Delta_{23} = (t_3 + t_{23}) - t_2, \quad \text{Reader2}$$

$$\Delta_{31} = (t_1 + t_{13}) - t_3, \Delta_{12} = (t_2 + t_{23}) - t_3, \quad \text{Reader3}$$

The time differences, $\Delta_{ij}$ are sent back to a server that computes the times $t_1, t_2, t_3$. The computations for these times can be performed in a number of ways; one approach is to use the least squares algorithm to compute these times. It is straightforward to add the deterministic circuit delays for each reader in the above equations, and to extend the algorithm to incorporate more than 3 readers.

Figure 9:
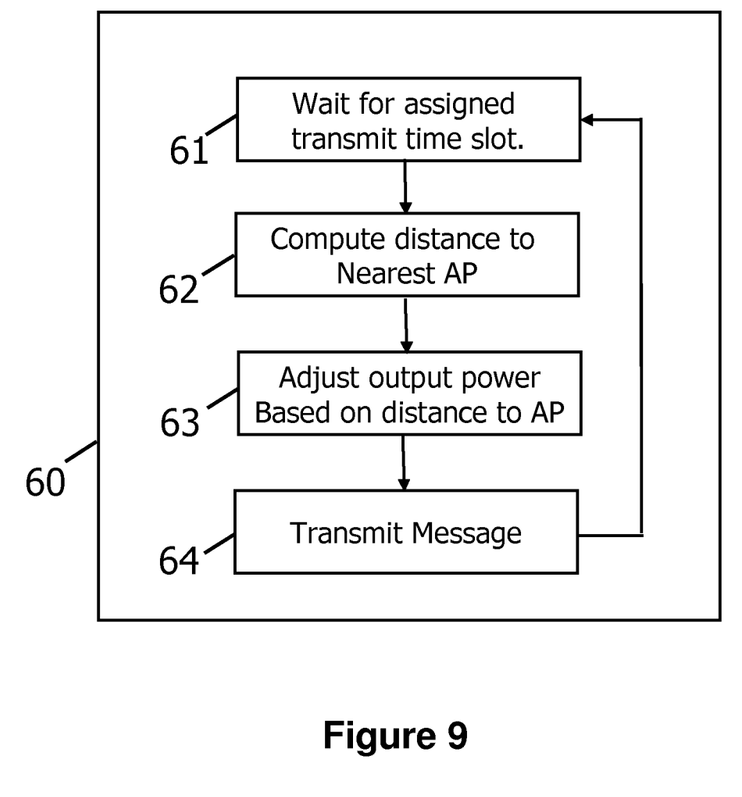
FIG. 9 is a flowchart which describes the operation of an RFID tag.

A flowchart depicting an embodiment of a tag operation 60 is shown in FIG. 9. In a region where multiple RFID tags are sending data to the same RFID reader, a method is required to ensure that the messages do not collide. In one embodiment, tags are not time synchronized to each other. In this case, tag picks a random time slot to transmit the message. If the tag population is small relative to the number of time slots, the probability of the messages colliding is small. In an alternate embodiment, the tag population is time synchronized by using the GPS receiver on board each tag. Each tag is programmed with a unique time slot 61 to ensure that collisions do not occur. As long as the number of time slots is greater than the number of tags communicating with a single RFID reader, the messages will not collide.

It is important to reduce the tag power consumption and interference generated from a tag to an RFID reader that is not the intended receiver. To achieve this goal, a subset of deployed RFID reader locations is downloaded to the tag. In one embodiment, the download can occur when the tag is charging. In an alternate embodiment, the RFID reader transmits the set of locations to the RFID tag. When the tag obtains its location through its GPS chip, it computes the distance to the nearest RFID reader 62. Based on this, as well as potentially using information about terrain, it adjusts its transmit power 63 to the minimal level required for the nearest RFID reader to decode its message and then it sends its message 64. For each message, 62-64 are repeated.

Adjusting the RFID tag output power as a function of distance from the tag to RFID reader may not be very accurate in more heavy built out urban areas, due to the density of buildings. To improve the performance of the RFID tag power control, a learning approach is taken. Initially, each RFID tag can transmit at a fixed transmit power. Each RFID reader receives the tag's location as well as measures the received signal strength (RSS) of the RFID tag's transmit signal. Each set of (location, RSS) pair is stored into a database. The RFID network can thus learn the path loss profile of large regions using this database as it becomes populated with more measurements. To power control an RFID tag, the database is downloaded to the tag's memory. When a tag receives a GPS location, it searches the database for the (location, RSS) pair that has location coordinates that is closest to its location. It then uses the RSS value to adjust its transmit power to minimize the output power yet have a high probability of being heard by the nearest RFID reader.

For applications where it is important to be able to transmit RFID tag data to the RFID reader with high reliably, the RFID reader can transmit an acknowledgement signal back to the RFID tag after the data transmission from the tag. Since the RFID reader may be far away from the tag, it may need to transmit a block PN code to the RFID tag. Although this disclosure has mainly focused on implementing the highly sensitive receiver at the RFID reader, the previously described block PN decoder can also be implemented at the RFID tag. To reduce the decoding complexity, the decoding can be performed in a non real time fashion. This allows the decoding algorithms to be implemented in hardware or software, potentially reducing the implementation cost.

CONCLUSION, RAMIFICATIONS, AND SCOPE

The scope of the present invention is not limited to the presently preferred embodiments disclosed herein. In many cases, the implementation described herein is merely a designer's preference and not a hard requirement. Accordingly, except as they may be expressly so limited, the scope of protection of the following claims is not intended to be limited to the specific embodiments described above. For instance, aspects of the invention that are described as implemented in hardware, such as special-purpose circuits, can be done in software on a general-purpose processor, or vice-versa, or both.

What is claimed is:

1. A method for decoding a block pseudo noise sequence, wherein the block pseudo noise sequence comprises an inner sequence and an outer sequence, the method comprising: receiving the block pseudo noise sequence at an RFID reader, wherein the block pseudo noise sequence was sent from an RFID tag, or receiving the block pseudo noise sequence at an RFID tag, wherein the block pseudo noise sequence was sent from an RFID reader; inputting the block pseudo noise sequence to an inner matched filter matched to the inner sequence;
   outputting the output of the inner filter matched to an outer matched filter, matched to the outer sequence; and outputting the output of the outer filter matched, wherein the outer filter is modified by summing two or more of the output taps of the outer matched filter and multiplying the output of these adders with one or more frequency correction factors to correct frequency offset between the RFID reader and the RFID tag.

2. A method for asynchronously determining an RFID tag position, the method comprising: sending, from the RFID tag, a tag message to each of a first RFID reader, a second RFID reader, and a third RFID reader;
   at the first RFID reader: decoding the tag message, and sending a reader message to the second RFID reader and the third RFID reader; computing a first set of time differences between the arrival of the tag message and the arrival of the second and the third reader messages; at the second RFID reader: decoding the tag message, and sending a second reader message to the first RFID reader and the third RFID reader; computing a second set of time differences between the arrival of the tag message and the arrival of the first and the third reader messages; at the third RFID reader: decoding the tag message, and sending a third reader message to the second RFID reader and the first RFID reader; computing a second set of time differences between the arrival of the tag message and the arrival of the first and the second reader messages; asynchronously determining, using the first, second, and third set of time differences, the RFID tag location.

3. The method of claim 2, wherein each RFID reader sends its reader message after a deterministic period of time.

4. The method of claim 2 wherein the RFID tags and the RFID readers are transmitting and receiving on the Ultra Wideband frequency band.

5. A block decoder for decoder a block pseudo noise sequence, wherein the block pseudo noise sequence comprises an inner sequence and an outer sequence, the block decoder comprising: an inner matched filter matched to the inner sequence that receives the block pseudo noise sequence and outputs matched filter data; an outer matched filter, matched to the outer sequence, that receives the matched filter data; and an adder which sums two or more of the outer matched filter output taps a multiplier which multiplies the output of the adder with one or more frequency correction factors to correct frequency offset between an RFID reader and an RFID tag.

6. The block decoder of claim 5, wherein each RFID reader sends its reader message after a deterministic period of time.

7. The block decoder of claim 5, wherein the RFID tags and the RFID readers are transmitting and receiving on the Ultra Wideband frequency band.

8. A decoder for decoding a block pseudo noise sequence, the decoder comprising: an input to a receiver to receive the block pseudo noise sequence to an inner matched filter matched to an inner sequence; an outer matched filter, matched to the outer sequence, that receives the output of the inner matched filter; a summation unit, which receives the output of the outer matched filter and sums two or more of the output taps of the outer matched filter; a multiplication unit that multiples the output the summation unit with one or more frequency correction factors to calculate a frequency offset.

9. An RFID reader which comprises the decoder of claim 8.

10. The RFID reader of claim 9, wherein the RFID reader receives the block pseudo noise sequence from an RFID tag.

11. The RFID reader of claim 10, wherein the frequency offset is between the RFID reader and the RFID tag.

12. An RFID tag which comprises the decoder of claim 8.

13. The RFID tag of claim 12, wherein the RFID tag receives the block pseudo noise sequence from an RFID reader.

14. The RFID tag of claim 13, wherein the frequency offset is between the RFID reader and the RFID tag.

* * * * *